O. V. GREENE.
PHOTOGRAPHIC APPARATUS.
APPLICATION FILED JULY 9, 1913.

1,236,928.

Patented Aug. 14, 1917.
2 SHEETS—SHEET 1.

WITNESSES
J. Smith
A. L. Gill

INVENTOR
Oscar V. Greene
BY Fay & Oberlin
ATTORNEYS

O. V. GREENE.
PHOTOGRAPHIC APPARATUS.
APPLICATION FILED JULY 9, 1913.

1,236,928.

Patented Aug. 14, 1917.
2 SHEETS—SHEET 2.

WITNESSES

INVENTOR
Oscar V. Greene
BY Fay & Oberlin
ATTORNEYS

UNITED STATES PATENT OFFICE.

OSCAR V. GREENE, OF CLEVELAND, OHIO.

PHOTOGRAPHIC APPARATUS.

1,236,928.         Specification of Letters Patent.     Patented Aug. 14, 1917.

Application filed July 9, 1913. Serial No. 778,065.

*To all whom it may concern:*

Be it known that I, OSCAR V. GREENE, a citizen of the United States, and a resident of Cleveland, county of Cuyahoga, and State of Ohio, have invented a new and useful Improvement in Photographic Apparatus, of which the following is a specification, the principle of the invention being herein explained and the best mode in which I have contemplated applying that principle, so as to distinguish it from other inventions.

The present improvements relate more particularly to apparatus designed for making photographic enlargements and reductions from transparent negatives of any kind on suitable sensitized surfaces; but such improved apparatus is also adaptable for copying prints and negatives. One object of the invention is to provide a single apparatus which may be optionally employed for making either enlargements or reductions from a negative, and one wherein adjustment to either of these uses may be quickly and easily effected. Another object is to provide an apparatus of the character referred to, in which the parts are gravity operated and the camera proper is self-focusing, no springs or gears being required for the last-named purpose. The operation is also so designed that by a very simple rearrangement of parts it may be utilized in printing from opaque surfaces, that is, from other prints instead of from negatives, either enlarging or reducing the same; while by yet another re-arrangement, similarly readily effected, lantern slides, or transparencies, may be made. To the accomplishment of the foregoing and related objects, the invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1:
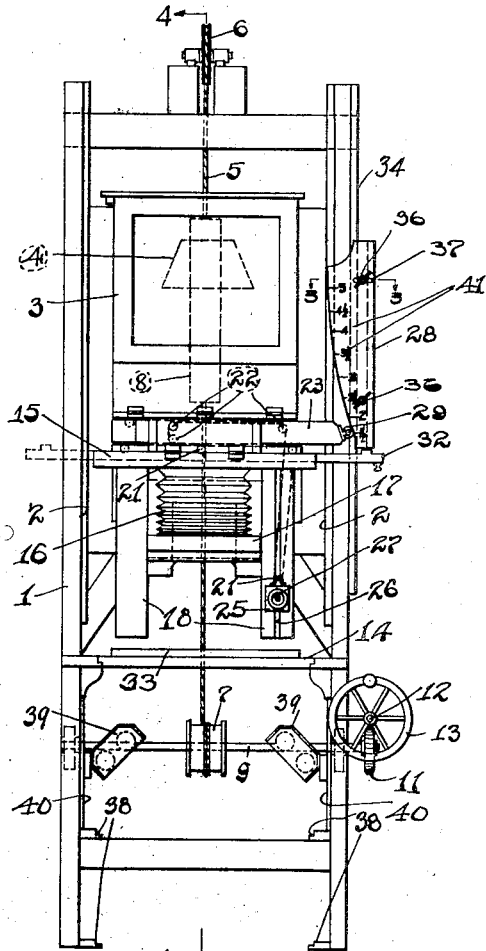
Figure 2:
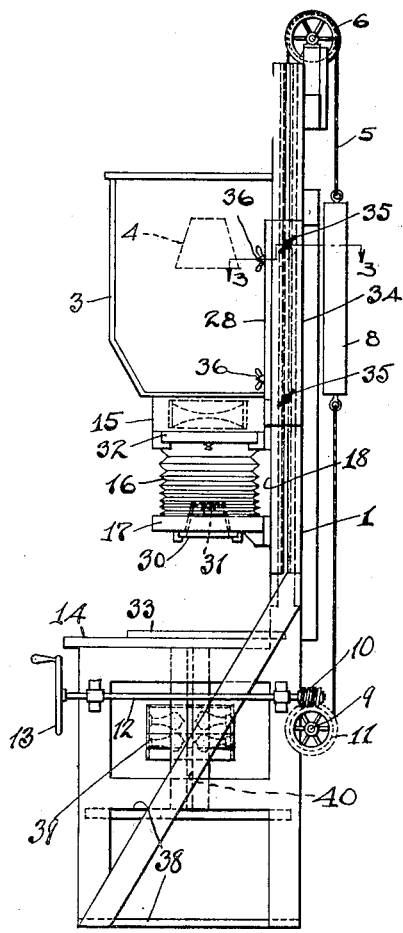
Figure 3:
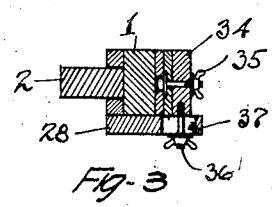
Figure 5:
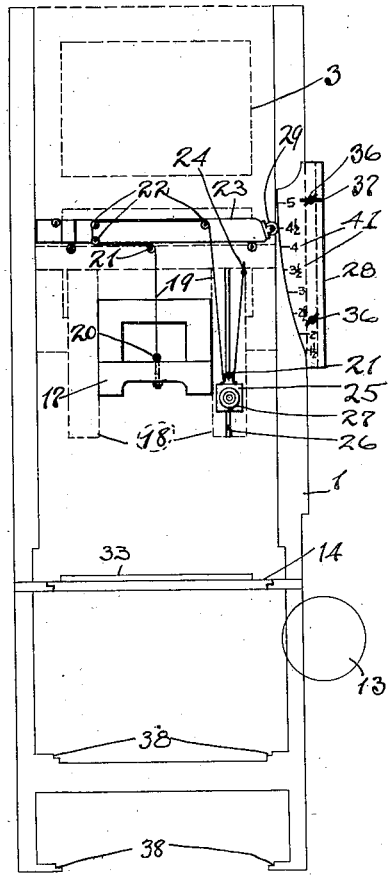
Figure 4:
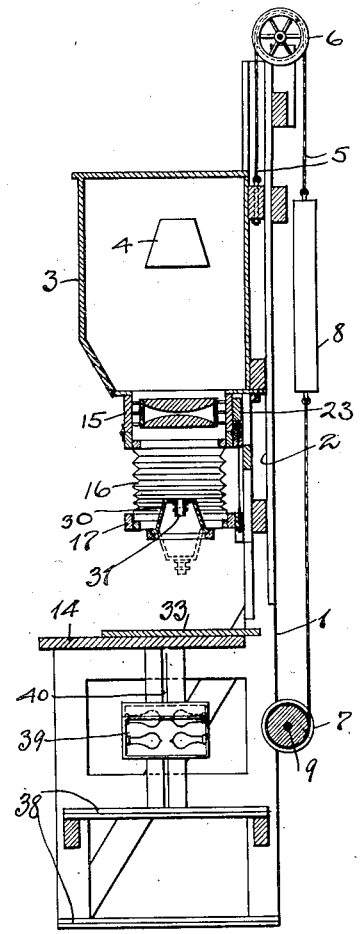

Figure 1 is a front elevation of an apparatus embodying my present improvements; Fig. 2 is a side elevational view of the same; Fig. 3 is a cross-section of a detail, as indicated by the line 3—3, Figs. 1 and 2; Fig. 4 is a central transverse section of the apparatus taken on the plane indicated by the line 4—4, Fig. 1; and Fig. 5 is a view corresponding with Fig. 1 but diagrammatic in part and showing the apparatus in a different operative position.

As has been indicated, gravity is utilized to effect the operation of the several movable parts, thus doing away with the necessity of any power mechanism, and requiring no particular effort on the part of the operator to make the various adjustments. To this end the general frame 1 of the machine is arranged vertically, such frame consisting in effect of a slide-way 2 whereon is supported a cabinet 3 adapted to be closed, and to house a lamp 4 or other suitable illuminating agent for use in the operations presently to be described. This cabinet is adjustably supported in said slide-way by means of a cable 5 extending therefrom upwardly over a pulley 6, and thence downwardly over a drum 7, to which its free end is attached. In the portion of the cable between the pulley and drum is attached a weight 8, that is a trifle lighter than the combined weight of the cabinet and parts attached thereto.

The drum 7 is mounted on a shaft 9 that is adapted to be rotated through the medium of a worm 10 and worm gear 11, such worm being carried on a second shaft 12 at right angles to the first and provided at its front end with a handled wheel 13. The worm, moreover, is irreversible, so that the shaft carrying the drum will be locked in whatever position it is left by the operator. By means of the foregoing mechanism it will be observed that the cabinet 3 with the parts attached thereto may be readily raised and lowered along the slide-way 2 so as to vary the distance between the same and a table 14 that projects forwardly from the slide-way at a convenient height above the floor, and is adapted to support an easel so that it may be shifted in a corresponding horizontal plane as desired.

The lower end of the cabinet 3 terminates in a supplemental chamber, or box 15, that is adapted to hold a negative carrier together with a condenser, as shown, or else a diffusion screen, and to the under side of such chamber is in turn attached the upper end of a bellows 16. The lower end of this bellows is attached to a bracket 17, supported on a slide 18 extending downwardly from the cabinet. Said bracket is held in adjusted relation to the cabinet by means of a cable or cord 19 attached at one end to an eye-bolt 20 (see Fig. 5) passing through the bracket. Cord 19 passes around pulleys 21 and 22 respectively fixed to the cabinet frame and to a transversely disposed bar 23, that is slidably secured to the same cabinet frame 5 the other end of said cord being secured to said frame at 24. As a result of the foregoing arrangement, any transverse movement of bar 23 will serve to raise or lower the bracket 17 relatively to the cabinet, depending upon the direction of such movement. One of the pulleys 21, is adjustably fixed to the frame, being carried on a counterweighted block 25 that slides up and down a slot 26 and may be secured, when in desired position, by means of a clamp nut 27.

Movement of the bar in one direction or the other is automatically secured through the agency of a cam plate 28 attached to the main frame of the apparatus adjacent to the cabinet and having its inner edge curved as clearly shown in Figs. 1 and 5. The adjacent end of the bar 23 carries a roller 29 which will be held in contact with such curved face of the cam plate by the weight of the bracket 17 attached to the lower end of the cord 19, as will be obvious. The particular curve given the inner edge of the plate may be either mathematically or empirically determined, so as to vary the position of the bracket relatively to the cabinet in any pre-determined fashion as the cabinet as a whole is raised or lowered with reference to the table.

By varying the location of the block 25 in slot 26, the proper initial focusing position for any particular lens can be determined, in order to make a print of given size. Thereafter the focusing is automatically effected through the action of the cam 28 on bar 23, movement of the latter paying out or drawing in cord 19, as the case may be.

A suitable holder 30 provided with an objective 31 is adapted to be attached to the bracket, either extending below the same, as indicated in dotted outline in Figs. 2 and 4, or above the same within the bellows as indicated in full lines in said figures. There is also provided a slide 32 in the chamber 15 below the light cabinet, which is adapted to receive the negative to be printed, constituting the negative carrier previously referred to.

While the theoretically correct curve be the edge of the cam plate will strictly be different for each particular lens, I have found, by experiment and calculation that a compromise curve can be obtained which will work very satisfactorily with several different lenses, as for instance, with a 5 inch, 6 inch, and 7 inch lens, providing the plate be adjusted in or out a trifle at its upper end. Said cam plate will also require to be adjusted vertically for each different focus of lens, so that the initial position of the bracket carrying the objective may be properly varied with reference to easel 33 resting on the table. Accordingly, I do not attach the plate 28 directly to the frame 1, but to a slide 34 (shown in Figs. 2 and 3), that is adapted to be held in desired position by means of clamp nuts 35. The plate is attached to said slide by bolts 36 with wing nuts, the plate being transversely slotted at 37 to receive the upper bolt, thus providing for the swinging in or out of the upper end of the plate, as just described.

The top of the table 14 is suitably held in the frame of the machine so that it may be removed and placed on either of two lower planes, two sets of supports 38 being provided to receive it. The back and sides of the lower portion of the frame surrounding the table when in this lower position may be inclosed if desired, in order to render such table available for use in contact printing. Lamps 39 moreover are removably secured to opposite side walls above the supports 38 in order to illuminate the table when in lower plane, the lamp holders being movable up and down on guides 40.

The foregoing apparatus may be utilized in a number of different ways, its universality of use being one of its important practical features. For ordinary enlarging or reducing, the arrangement of parts will be substantially as shown in Figs. 1, 2 and 3, with the objective carried below or above the bracket, as the case may be. A suitable negative being then placed in the slide 32 and brought in alinement with said objective and the source of light, it is merely necessary for the operator to raise or lower the cabinet by turning wheel B until the projected image on the easel is of the desired size. The focusing, in other words, is taken care of automatically by the cam plate 28 cooperating with the bar 23, which simultaneously raises or lowers, relatively to the cabinet, the bracket supporting the objective. While this adjustment is being made a colored glass plate may be interposed between the light and the objective, such plate being carried at one end of the same slide 32 which carries the negative. On the other hand, reliance may be placed in adjusting the apparatus to produce a print of the desired size upon a scale on the cam plate, for the latter may be readily graduated for lenses of different focus to indicate the size of print that will be secured when the roller 29 on the bar 23 registers with any particular mark 41 on such scale.

For copying from opaque objects, photographs, printed matter and the like, the table top 14 with easel 33 is dropped to one of the lower planes indicated by the supports 38. The dry plate, or paper, designed to receive the image will be placed in one side of the slide or carrier 32, the object to be copied being placed on the easel where it is illuminated by the lamps 39, the lamp 4 in the cabinet being dark. The cam plate 28 is then dropped a distance equal to the drop of the easel 33 from the position it is shown as occupying in the several figures of the drawings. With this arrangement, it will readily be seen that an image of any object placed on the easel will be projected by the objective 31 onto the slide 32 in reduced size, depending upon the distance between such slide and the easel 33; also that the cam plate 28 will coöperate with the bar 23 to provide automatic focusing just as in the arrangement for enlarging, save that the scale in the cam plate will indicate times of reduction of the image being copied instead of the times of enlargement. A mirror may be employed to position the image on a plate of ground glass in the slide preliminarily to actually copying onto sensitized material, such mirror replacing the condenser or diffusing screen in box 15 and being held at an angle of 45 degrees to the plane of the slide, facing the front of the apparatus.

For contact printing, table top 14 should be of glass, or have a pane of glass of suitable size inset in it, and the lights 39 should be placed so as to illuminate the under side of this glass table top, such top occupying its normal position as shown in the drawings. The negative to be printed will then be placed on top of the glass, a sensitized paper being held in contact with the negative by a suitable pressure plate that need not be described in detail, the lights 39 providing the necessary illumination.

While in the arrangement of the apparatus shown in the drawings, the differential movement controlled by the cam plate is transmitted to the objective holder of the apparatus, the negative carrier being relatively fixed, it will be understood that this differential movement, which it is required should be given one or the other of the two conjointly moving camera parts, may equally well be transmitted to the negative carrier the objective holder being relatively fixed. In other words, of the three essential elements of the apparatus, the easel, the objective holder, and the negative carrier, the two which have a conjoint movement with respect to the third are at the same time automatically adjusted relatively to each other by imparting a differential movement to the one incidentally to its conjoint movement.

Not only is the focusing of the camera thus automatically accomplished in my improved apparatus, but the various operations which remain to be manually performed by the operator are very much facilitated by the arrangement of parts, the counterweighting of the light-cabinet and the portions of the apparatus supported therefrom, and the counterweighting in turn of the objective holder forming one such portion. Furthermore, it will be observed that not only the cam-plate but also the hand-wheel 13 for raising and lowering the light-cabinet, and the nut 27 which serves as a handle for raising and lowering the counterweight 25, as well as for securing the same and thereby the pulley 21 in selected position on slideway 26, are all located within convenient reach of the right hand of the operator, leaving his left hand free to manipulate the easel and to place material on said easel and remove the same therefrom.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In apparatus of the character described, the combination with an easel, an objective holder, and a negative carrier, two of said members being conjointly movable with respect to the other; a bar carried by one of said two members so as to be movable transversely of the direction of their conjoint movement; flexible connections between said bar and the other of said two members; and a cam-plate coöperative with said bar to move the same and thereby differentially move the other of said two conjointly movable members incidentally to their conjoint movement.

2. In apparatus of the character described, the combination with an easel, an objective holder, and a negative carrier, two of said members being conjointly movable with respect to each other; a bar carried by one of said two members so as to be movable transversely of the direction of their conjoint movement, connections between said bar and the other of said two members; and a cam plate coöperative with said bar to move the same upon conjoint movement of said two members, movement of said bar being adapted to so move the other of said two conjointly movable members differentially as to maintain the same in the correct focal relation.

3. In apparatus of the character described, the combination of a vertically arranged slide way; a light cabinet movable on said slide way; a relatively adjustable objective holder and negative carrier attached to said cabinet; a counter-weight for said cabinet; a cable connected to said cabinet; and means for winding said cable to position said cabinet.

4. In apparatus of the character described, the combination of a vertically arranged slide-way; a light-cabinet movable on said slide-way; a relatively adjustable objective holder and negative carrier attached to said cabinet; a counter-weight for said cabinet; and means adapted to adjust the position of said cabinet, said means including a drum, a cable attached to said weight and passing around said drum, and means for turning said drum.

5. In apparatus of the character described, the combination of a vertically arranged slide-way; a light-cabinet movable on said slide-way; a relatively adjustable objective holder and negative carrier attached to said cabinet; a counter-weight for said cabinet; and means adapted to adjust the position of said cabinet, said means including a drum, a cable attached to said weight and passing around said drum, and an irreversible worm and worm-gear for turning said drum.

6. In apparatus of the character described, the combination of a frame provided with a vertically arranged slide-way; an easel horizontally supported in said frame; a light cabinet movable on said slide-way toward and from said easel; an objective holder and negative carrier attached to said cabinet; a counter-weight for said cabinet; means adapted to adjust the position of said cabinet; and other means adapted to vary the relative position of said objective holder and negative carrier.

7. In apparatus of the character described, the combination of a frame provided with a vertically arranged slide-way; an easel adapted to be horizontally supported in said frame in different horizontal planes; a light cabinet movable toward and from said easel; an objective holder and negative carrier attached to said cabinet; a counter-weight for said cabinet; means adapted to adjust the position of said cabinet; and other flexible means adapted to adjust the relative positions of said objective holder and negative carrier.

8. In apparatus of the character described, the combination of a frame provided with a vertically arranged slide-way; an easel horizontally supported in said frame; a light-cabinet movable on said slide-way; a negative carrier attached to said cabinet; an objective holder suspended from said cabinet below said carrier but movable independently of the same; and automatic means adapted thus to move said holder incidentally to movement of said cabinet, said means including a movable member carried by said cabinet, a relatively fixed member coöperating therewith, and flexible means operatively connecting said member and holder.

9. In apparatus of the character described, the combination of a frame provided with a vertically arranged slide-way; an easel horizontally supported in said frame below said slide-way; a light-cabinet movable on said slide-way; a negative carrier attached to said cabinet; an objective holder suspended from said cabinet below said carrier but movable independently of the same; and automatic means adapted thus to move said holder incidentally to movement of said cabinet, said means including a movable member carried by said cabinet, a relatively fixed member coöperating therewith, and a cord operatively connecting said member and holder.

10. In apparatus of the character described, the combination of a frame provided with a vertically arranged slide-way; an easel horizontally supported in said frame; a light-cabinet movable on said slide-way; a negative carrier attached to said cabinet; vertical guides depending from said cabinet; an objective holder carried by said guides; a transversely movable member carried by said cabinet; a relatively fixed cam member coöperating with said movable member; a pulley carried by said cabinet; and a cord passing over said pulley and connecting said member and holder.

11. In apparatus of the character described, the combination of a frame provided with a vertically arranged slide-way; an easel horizontally supported in said frame; a light-cabinet movable on said slide-way; a negative carrier attached to said cabinet; vertical guides depending from said cabinet; an objective holder carried by said guides; a transversely movable member carried by said cabinet; a relatively fixed cam member coöperating with said movable member; a pulley carried by said cabinet, said pulley being adjustable relatively to said member; and a cord passing over said pulley and connecting said member and holder.

12. In apparatus of the character described, the combination of a frame provided with a vertically arranged slide-way; an easel horizontally supported in said frame; a light-cabinet movable in said slide-way; a negative carrier attached to said cabinet; vertical guides depending from said cabinet; an objective holder carried by said guides; a transversely movable member carried by said cabinet; a relatively fixed cam member coöperating with said movable member; two pulleys carried by said cabinet, one fixed, the other adjustable, relatively to said member; a third pulley carried by said member; and a cord attached at one end to said holder and at the other to said cabinet, said cord passing around the pulleys.

13. In apparatus of the character described, the combination of an easel and a camera, said camera including an objective holder and negative carrier; means for varying the distance between said easel and camera; and means adapted to automatically impart a differential movement to one of said camera parts, said last named means including a cam-member, a second member coöperative therewith, and a cord operatively connecting said second member and camera part.

Signed by me, this 8th day of July, 1913.

OSCAR V. GREENE.

Attested by—
 A. L. GILL,
 JNO. F. OBERLIN.